United States Patent
Di Giorgio et al.

(10) Patent No.: US 6,474,544 B2
(45) Date of Patent: Nov. 5, 2002

(54) ELECTRONIC VAULT FOR USE IN PROCESSING SMART PRODUCT TRANSACTIONS

(75) Inventors: Rinaldo Di Giorgio, Stony Brook, CA (US); Theodore Goldstein, Boulder Creek, CA (US); Diana Neiman, Los Altos, CA (US); Michael Bender, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 92 days.

(21) Appl. No.: 09/045,590

(22) Filed: Mar. 23, 1998

(65) Prior Publication Data

US 2002/0055908 A1 May 9, 2002

(51) Int. Cl.⁷ .............................................. G06F 17/60
(52) U.S. Cl. ....................... 235/379; 235/375; 235/382; 235/385
(58) Field of Search .......................... 705/39, 35, 41, 705/44, 26; 235/380, 382, 375, 379

(56) References Cited

U.S. PATENT DOCUMENTS

| | | | |
|---|---|---|---|
| 4,849,615 A | 7/1989 | Mollet | 235/380 |
| 4,874,935 A | 10/1989 | Younger | 235/492 |
| 5,003,595 A | 3/1991 | Collins et al. | 380/25 |
| 5,120,939 A | 6/1992 | Claus et al. | 235/382 |
| 5,190,285 A | 3/1993 | Levy et al. | 273/85 |
| 5,195,087 A | 3/1993 | Bennett et al. | 370/62 |
| 5,310,999 A | 5/1994 | Claus et al. | 235/384 |
| 5,392,346 A | 2/1995 | Hassler et al. | 379/265 |
| 5,406,619 A | 4/1995 | Akhteruzzaman et al. | 379/95 |
| 5,450,491 A | 9/1995 | McNair | 380/25 |
| 5,459,304 A | 10/1995 | Eisenmann | 235/382 |
| 5,461,217 A * | 10/1995 | Claus | 235/380 |
| 5,475,756 A | 12/1995 | Merritt | 380/24 |
| 5,475,757 A | 12/1995 | Kelly | 380/24 |
| 5,477,215 A | 12/1995 | Mandelbaum | 340/825.34 |
| 5,513,261 A | 4/1996 | Maher | 380/23 |
| 5,530,232 A | 6/1996 | Taylor | 235/380 |
| 5,541,583 A | 7/1996 | Mandelbaum | 340/825.54 |
| 5,552,897 A | 9/1996 | Mandelbaum et al. | 358/400 |
| 5,590,038 A * | 12/1996 | Pitroda | 705/41 |
| 5,590,383 A * | 12/1996 | Pitroda | 705/44 |
| 5,594,223 A | 1/1997 | Kenneth et al. | 235/492 |
| 5,649,118 A | 7/1997 | Carlisle et al. | 395/241 |
| 5,742,845 A * | 4/1998 | Wagner | 710/11 |
| 5,898,838 A * | 4/1999 | Wagner | 709/224 |
| 5,905,908 A * | 5/1999 | Wagner | 710/11 |
| 6,023,683 A * | 2/2000 | Johnson et al. | 705/26 |
| 6,055,516 A * | 2/2000 | Johnson et al. | 705/26 |

FOREIGN PATENT DOCUMENTS

| | | | | |
|---|---|---|---|---|
| AU | 200026210 | * | 8/2000 | G07F/19/00 |
| EP | 1070305 A1 | | 1/2001 | G07F/19/00 |
| EP | 1070305 A | * | 1/2001 | G07F/19/00 |
| WO | WO200043962 A1 | | 7/2000 | G07F/19/00 |
| WO | WO200043962 A1 | * | 7/2000 | |

OTHER PUBLICATIONS

From DialogClassic file 16, Cubic Corp. developed "Contactless" smartcard technology takes another step forward, Business Wire trade magazine, p0494, Dec. 6, 1999.*

From DialogClassic file 696, Items of Interest: Report on smart cards, BRP Publications Newsletter, v12 issue 18, Sep. 28, 1998.*

(List continued on next page.)

*Primary Examiner*—Cuong Nguyen
(74) *Attorney, Agent, or Firm*—Finnegan, Henderson, Farabow, Garrett & Dunner, L.L.P.

(57) ABSTRACT

An electronic vault includes an array of smart products for use in processing associated transactions. Because smart product transactions usually require that a value of currency always be stored on a particular smart product, the vault provides a collection of smart products storing digital currency values for use in processing a high volume of associated transactions.

25 Claims, 6 Drawing Sheets

OTHER PUBLICATIONS

From DialogClassic file 47, Washington, San Francisco move to smart cards, Railway Age, 200, 7, 4, Jul. 1999.*

Reid, Metrorail to take a high–tech trip with Smart Card, The Washington Post, Jul. 5, 1998, Final Edition, A section, p.A01 (from DialogClassic Web file 146).*

Michael Dinning, Smart cards: debunking the myth, Mass Transit, v 23 n 4, p 34(5), Aug. 1997 (from DialogClassice Web file 148).*

From DialogClassic file 9, Uncle Sam wants you . . .to use smart cards, Card Technology Journal, p. 78+, Nov. 1999.*

Fro DialogClassic file 9, Bay Area tests mass transit info service (Motorola and ERG group will test a smart card transit payment system . . .), Wireless Week Journal, p. 28, Jun. 28, 1999.*

From DialogClassic file 9, Transit agency has a capital idea in offering a chip/MAg–stripe card (Cards with magnetic stripe and chip will serve transitional period between magnetic stripe cards and smart cards . . .), Debit card News Newsletter, May 31, 1999.*

From Dialog Classic Web(TM), file 16, Cubic Corp. Developed "Contactless" Smart Card Technology Takes Another Step Forward, Business Wire, p0494, Dec. 6, 1999.

From Dialog Classic Web(TM) file 148, Smart cards: debunking the myth, by Michael Dinning of Mass Transit MAgazine, v23, n4 p34(5), 7–8/1997.

Collins, Smart passport paves way for identify cards, Computer Weekly, p1, Jan. 13, 2000 (from Dialog Classic Web(TM) file 16).

From Dialog Classic Web(TM) file 16, Gemplus to showcase industry's broadest range of smart card solutions at Cardtech/SecurTech '99, Business Wire, p0211, May 7, 1999.

ASESoft—The Smart Smart Card API, Aladdin Knowledge Systems Ltd. (1985–97).

The Linus–PAM System Asministrators' Guide, Andrew G. Morgan (Nov. 18, 1996).

"Mondex USA puts Mondex in chip card lead," (1996).

"ASEDrive Pro™—The Versatile Smart Card Drive," Aladdin Knowledge Systems Ltd. (1985–97).

Artech Datatronic Smartcard Solutions document.

The Privacy Committee of New South Wales, "Smart Cards: Big Brother's Little Helpers," Chris Connelly, No. 66, Aug. 1995, Australasian Legal Information Institute.

JAVA 1.1 Developer's Guide Second Edition, Jamie Jaworski, Sams.net Publishing (1997).

JAVA IQ Test., "Smart cards come to the Web—are you ready?," Trish Gorman, Netscape World.

Microeconomic Theory, Andreau Mas–Colell, Michael D. Whinston and Jerry R. Green, Oxford University Press, 1995, pp. 5–131.

Microeconomics, Robert S. Pindyck, Daniel L. Rubinfeld, Second Edition, 1992, pp. 3–137.

Microeconomics, Michael L. Katz, Harvey S. Rosen, Second Edition, Richard D. Irwin, Inc., 1991 and 1994, pp. 1–169.

Encyclopedia of Computer Science, Third Edition, Anthony Ralston, Edwin D. Reilley, 1993, pp. 1141–44.

* cited by examiner

ELECTRONIC VAULT FOR USE IN PROCESSING SMART PRODUCT TRANSACTIONS

REFERENCE TO RELATED APPLICATION

The present application is related to U.S. patent application of Jonathan Bredin, Ser. No. 09/003,704, filed on Jan. 7, 1998, and entitled "Methods and Apparatus for Processing Smartcard Transactions," which is incorporated herein by reference.

FIELD OF THE INVENTION

The present invention relates to an apparatus or database for use in processing transactions relating to smart products.

BACKGROUND OF THE INVENTION

Smartcards are credit card-type cards with a microprocessor that works in conjunction with a smartcard reader. The microprocessor processes transactions involved in purchases of products or services, and these transactions use a "purse" or stored data, in the card, identifying a value of the card. A smartcard typically includes data encryption capabilities for secured transactions. In general, when a user inserts a smartcard into a reader, a user interface or screen displays to the user a value present in the smartcard and allows the user to conduct a transaction involving the smartcard. A user may, for example, use the smartcard to purchase a particular product, at which time the smartcard reader verifies the transaction and reduces the purse by a corresponding amount.

Smartcard transactions typically require the use of two smartcards. When a user purchases a product, for example, the value of the user's smartcard is reduced and the value of the seller or merchant's smartcard is increased by a corresponding amount. In addition, value may be transferred from one smartcard directly to another, which provides the advantage of avoiding or reducing the cost of processing transactions in comparison to conventional credit card transactions.

A known protocol for processing smartcard transactions is referred to as Mondex authentication by Mondex International Limited. Mondex authentication requires the use of two smartcards to process a transaction. The Mondex authentication, for example, does not permit value to be transferred from a smartcard to an entity other than another smartcard. Rather, value must be transferred from one smartcard to another.

Certain entities, such as authorized banks, are permitted to convert a digital representation of a currency value on a smartcard into hard currency or the representation of currency in a user's bank account. However, only a certain limited number of these institutions exist and smartcard transactions otherwise must ordinarily use at least two smartcards, as the digital value of currency must always reside on a smartcard.

The requirement of at least two smartcards for a transaction places certain limits on smartcard transactions. If many smartcard users attempt to transfer currency to or from their smartcards at the same time, a system may have difficulty processing such a large volume of requests as it requires another smartcard for each transaction. In addition, many smartcards have a relatively low limit in terms of currency value, which places limits on smartcard transactions involving high currency values.

Accordingly, a need exists for an apparatus and method for improved processing of smartcard and related transactions.

SUMMARY OF THE INVENTION

Apparatus and methods consistent with the present invention process electronic transactions using a collection of electronically accessible smart products such as smartcards and devices with similar functionality.

An apparatus consistent with the present invention electronically receives a request for a smart product transaction. The apparatus selects a particular smart product among a plurality of electronically accessible smart products, and it processes the transaction using the selected smart product.

A method consistent with the present invention includes electronically receiving a request for a smart product transaction. A particular smart product is selected among a plurality of electronically accessible smart products, and the transaction is processed using the selected smart product.

A database consistent with the present invention may be used to process smart product transactions. The database includes a plurality of vectors, each of the vectors identifying an address for accessing a particular smart product within a group of electronically accessible smart products, and identifying a value of the particular smart product. The database also includes a plurality of types of currencies, each of the types of currencies being associated with at least one of the vectors.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Introduction

An apparatus and method consistent with the present invention provides an electronic vault for use in processing associated with smart products. The term "smart product" encompasses smartcards, other devices having smartcard-like processing capability, and combinations of the smartcards and the other devices. Examples of those other devices include portable devices having the ability to securely store a representation of funds for purchases of products or services, or to securely store personal information. For example, a product known as the "Java™ ring," developed by Sun Microsystems, Inc., is a wearable ring having embedded therein a processor, memory, and contacts for providing smartcard-like processing capability. Other such devices may include watches or other wearable physical entities including embedded microprocessors with associated memory and contacts for providing smartcard-like processing capability. Accordingly, an apparatus consistent with the present invention is not limited to smartcards and may be used with other physical embodiments having smartcard-like processing capability. Java and Java-based trademarks are trademarks or registered trademarks of Sun Microsystems, Inc. in the United States and other countries.

The vault includes a plurality of electronically accessible smart products electronically connected to a vault manager machine. The vault manager machine provides software processing through a network to other smart products accessible through the network. The plurality of smart products in the vault, in conjunction with a database to manage the vault, provides a collection of digital values of currency for use in processing smart product transactions. This type of vault is particularly useful for smart products having a low limit in terms of their currency values and for a high volume of smart product transactions. It also may provide the advantage of avoiding transaction costs associated with, for example, conventional credit card transactions.

The vault may be used to electronically process smart product transactions, which may include any transaction involving use of a smart product. Those transactions include, for example, transfer of funds and purchase of a product or service. When a user desires to transfer funds onto a smart products, the user inserts the smart product into a reader, which is connected through a network to a vault manager machine. The vault manager machine selects a particular smart product, or a plurality, in the vault and, using a value in the purse of the selected smart product or plurality, it performs the requested transfer of finds. The vault may be used, for example, by a bank authorized to convert digital values of currency on smart products into hard currency or other representations of the currency such as a user's bank account.

Merchants may use a local vault and corresponding vault manager machine for use in processing smart product transactions involving purchases of their products or services. The local vault and corresponding manager provide a local mechanism for the merchant to perform the smart product transactions, as those transactions typically require two smart products. The merchant may transfer the funds from their local vault to a vault within a bank, which may transfer the merchant's value of currency on their smart products into, for example, a bank account for the merchant. The use of a smart product vault in connection with the vault manager machine thus provides an apparatus for efficiently conducting smart product transactions.

Network

Figure 1:
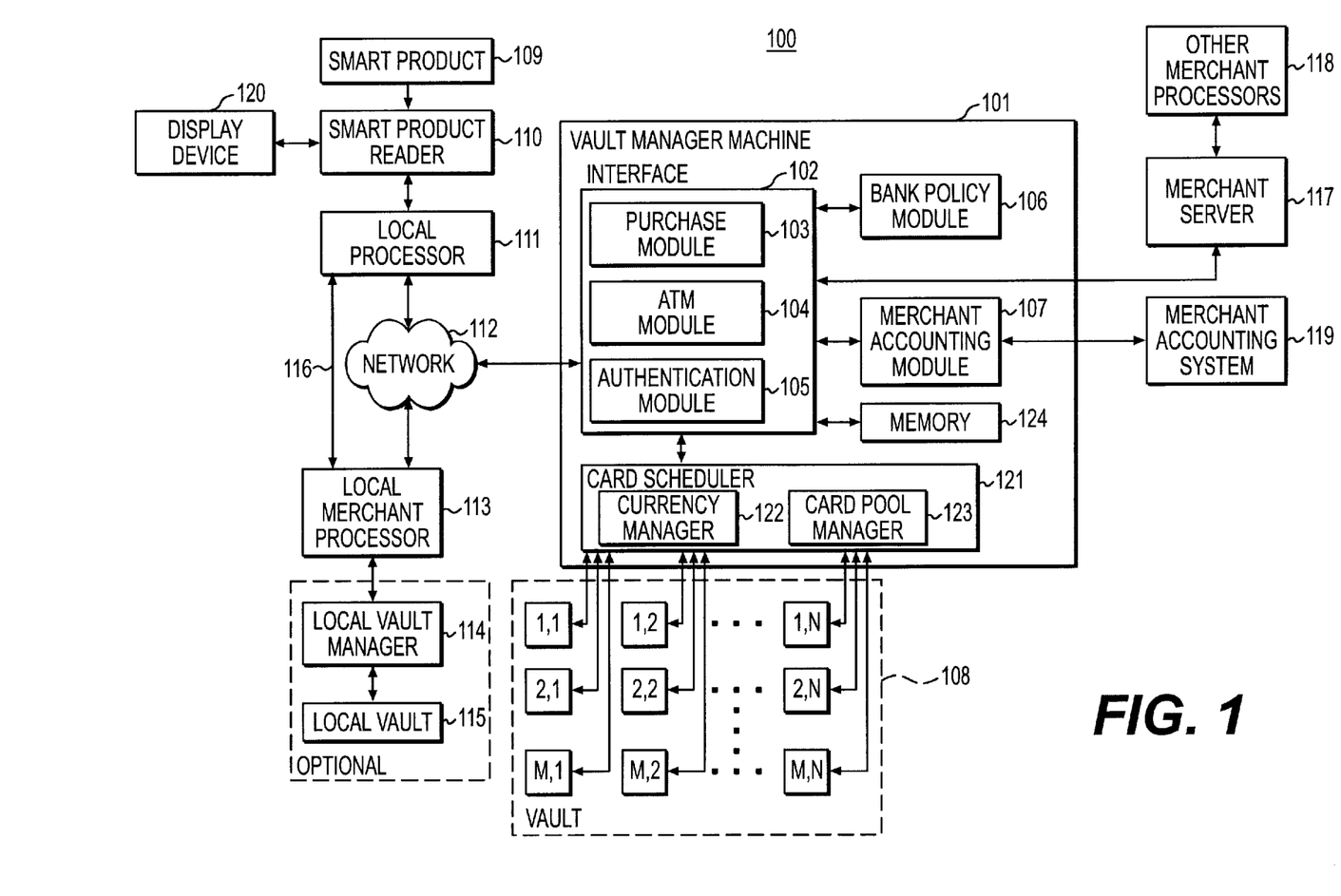
FIG. 1 is a diagram of an exemplary network including structure for processing smart product transactions consistent with the present invention.

FIG. 1 is a diagram of a network 100 for use in processing smart product transactions. It includes a vault manager machine 101 having a plurality of software modules implemented, for example, using a Solaris® or Windows NT platform, or any type of computer processor, and code written in a suitable programming language. Vault manager machine 101 manages a smart product vault 108, explained below, and it includes an interface 102 for processing smart product transactions between vault 108 and other smart products. Interface 102 includes, for example, a purchase module 103, an ATM module 104, and an authentication module 105, all of which may be implemented using software. Interface 102 is connected to a network 112, which may represent an Internet protocol or telephone network. Interface 102 is also connected with a memory 124, which may be implemented with a computer memory for storing information and may alternatively be located outside of vault manager machine 101 and interfaced with it via an electrical connection. Memory 124 may be used to store a database for use in managing vault 108.

Interface 102 is coupled to vault 108 through a card scheduler 121. The boxes within vault 108 represent physical smart products and the corresponding readers, and the numbers within those boxes represent the row and column number of a particular smart product in the vault. In particular, they represent smart products inserted into readers in, for example, a physical rack, each of the readers electronically coupled to vault manager machine 101. Each smart product through its corresponding reader is thus electronically accessible to vault manager machine 101, meaning that vault manager machine 101 may access individual smart products in the vault 108 (through the readers) using electronic signals. Vault manager machine 101 uses the processing of card scheduler 121 to select a particular smart product, or a plurality, for processing a transaction. Card scheduler 121 includes two software modules, a currency manager 122 and a card pool manager 123, the functions of which may alternatively be implemented in hardware or a combination of hardware and software.

Vault manager machine 101 also includes hardware or software, or a combination, for providing an electronic connection between modules 103–105 and the physical smart products within vault 108. That functionality or logic may reside within card scheduler 121. For example, upon receiving a particular address, card scheduler 121 establishes an electronic connection with the particular smart product, and corresponding reader, at that address in vault 108. The functions of card scheduler 121, including currency manager 122 and card pool manager 123, may reside within vault 108, vault manager machine 101, or a combination of both.

Vault manager machine 101 also typically includes a bank policy module 106 for providing certain rules relating to smart product transactions, and a merchant accounting module 107 for recording and tracking merchants accounts, similar to a bank balance, associated with the vault. Merchant accounting module 107 is typically connected to a merchant accounting system 119 for providing accounting-type services for merchants. Examples of commercial embodiments of merchant accounting systems are known in the art and include products sold by Mercantec, Inc. Interface 102 may also be coupled via a merchant server 117 to other merchant processors 118 for processing smart product transactions occurring through readers which may be connected to other merchant processors 118.

A local processor 111 may interface a smart product reader 110 with network 112. Local processor 111 provides the processing and functions for interfacing reader 110 with network 112, and reader 110 may be connected to a display device 120 for displaying information to a user. Reader 110 reads information from and writes information to a smart product 109. Such readers are known in the art, and examples of embodiments for readers include an ATM, kiosk, personal computer, and electronic wallet.

Network 112 may also interface vault manager machine 101 with a local merchant processor 113 connected to a local vault manager machine 114 and local vault 115. Local vault manager machine 114 and local vault 115 may have the same processing capabilities and database structure as, for example, vault manager machine 101 and vault 108. Local vault manager machine 114 and local vault 115 are optional in that a merchant does not necessarily require a local vault at its facility for conducting smart product transactions with vault manager machine 101.

Local merchant processor 113 provides the functions and processing capability for interfacing the local vault manager machine 114 with network 112. In addition, local processor 111 may be connected directly, as shown by connection 116, with local merchant processor 113, or may be so connected through network 112. Therefore, reader 110 may be located physically proximate local merchant processor for providing purchases using a smart product at the merchant's facility, or alternatively reader 110 may be remote from the merchant's facility and interfaced with the merchant processor through network 112 for providing remote purchase of products or services from the merchant.

Database Structure

Figure 2:
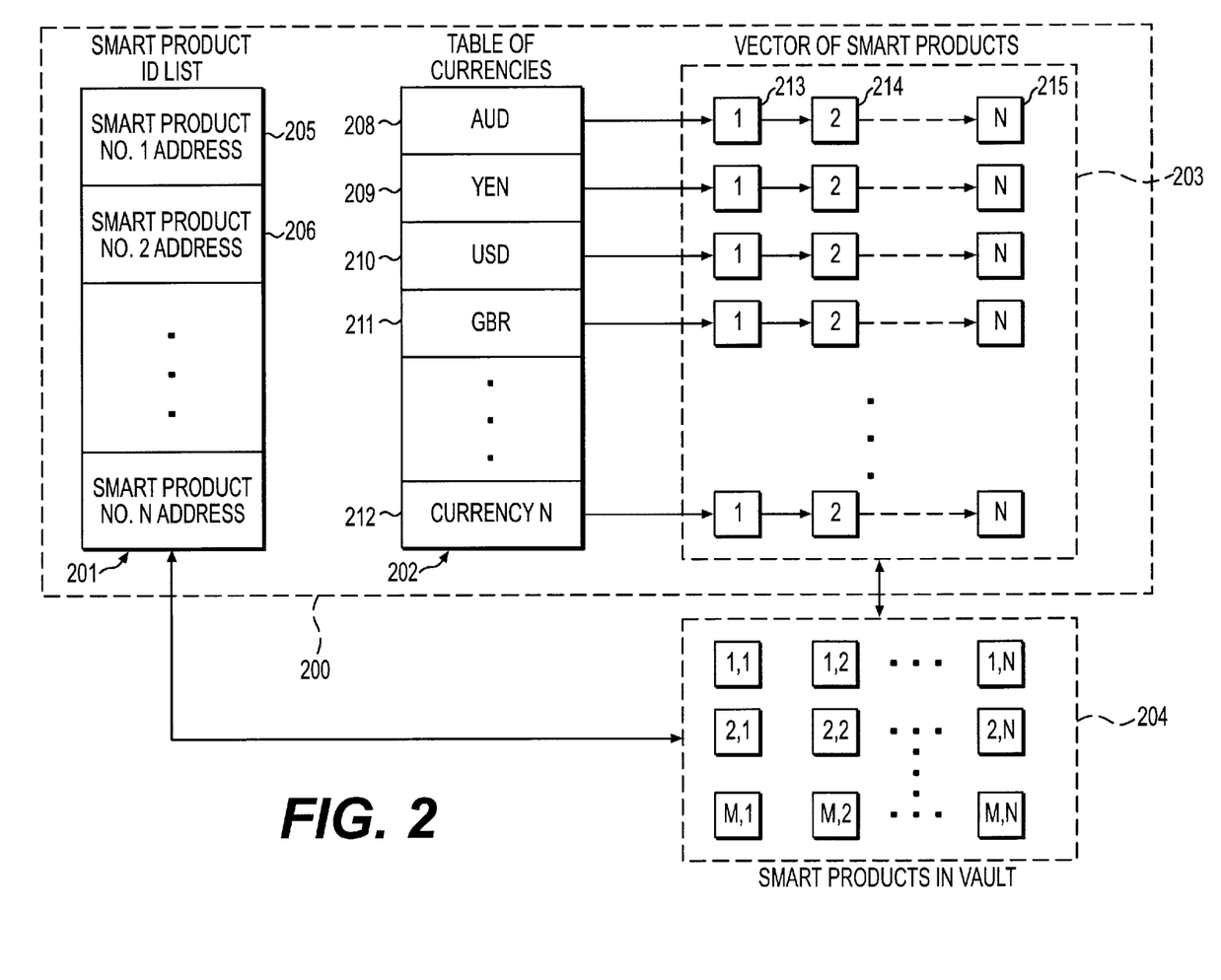
FIG. 2 is a diagram of an exemplary database for use in processing smart product transactions consistent with the present invention.

FIG. 2 is a diagram of a database 200 for use in processing smart product transactions in conjunction with a smart product vault. Database 200 may be stored in memory 124 and thus accessible to modules of vault manager 101. Database 200 includes software structures logically related to a representation of a vault 204, corresponding to vault 108 and vault 115 shown in FIG. 1. Vault 204 is shown in FIG. 2 to illustrate its relationship with database 200. As shown, vault 204 has an array representing smart products. Other configurations are possible. For example, vault 204 (and vaults 108 and 115) may include a column of smart products, a row of smart products, or some other physical configuration, provided that each smart product, through its corresponding reader, may be individually addressable.

As shown in FIG. 2, database 200 includes a smart product identification (ID) list 201, including an array of addresses for the location of smart products within vault 204. As shown, it includes an address 205 for a smart product 1, an address 206 for a smart product 2, and additional addresses for additional smart products in the vault. The numbers are typically listed in sequential order with the corresponding addresses but may be listed in other orders.

Database 200 also includes a plurality of currencies shown, for example, in a table 202. Table 202 includes an array of various currencies, such as a currency 208 for Australian dollars, a currency 209 for Yen, a currency 210 for U.S. dollars, a currency 211 for Great Britain pounds, and additional currencies such as a currency 212 for a currency N. Currencies may also be user defined. Therefore, a merchant may define its own currency and offer units of such currency to be stored on smart products of its customers for use in purchasing its products or services. Creating user-defined currency provides the advantage of permitting a change in the merchant's prices of its products or services by simply changing the value of its currency.

Database 200 also includes vectors. In particular, each of the currencies in table 202 points to a vector array 203 of smart products. For example, currency 208 for Australian dollars points to vectors 213, 214, and 215. Each currency may include one or more vectors in array 203, depending upon the number of smart products existing in vault 204 and storing a value of that currency. Each vector, such as vector 213, represents a physical smart product in vault 204 and typically includes a representation of an amount of currency on the corresponding smart product, a card number representing a location or address of the smart product, and how many times the smart product has been used. The vectors may be modified to include additional information for processing or statistical purposes, such as how often a particular smart product fails.

ID list 201 and vector array 203 are logically related to the smart products in vault 204. Using ID list 201 and vector array 203 means that the smart products in vault 204 are addressable either by a number, or by currency. providing such software database structures thus increases processing speed and capability, and it provides for an efficient method of accessing smart products within the vault. Thus, database 200 typically includes both ID list 201 and hash table 202 along with corresponding vector array 203. Alternatively, database 200 may include only one of those structures.

Moreover, certain smart products in the vault may be assigned to a particular customer for servicing only that customer, which helps to ensure a certain level of service for that customer. Alternatively, a pool of smart products may be assigned to a particular customer or a plurality of customers.

Vault Manager Machine Modules

Figure 3:
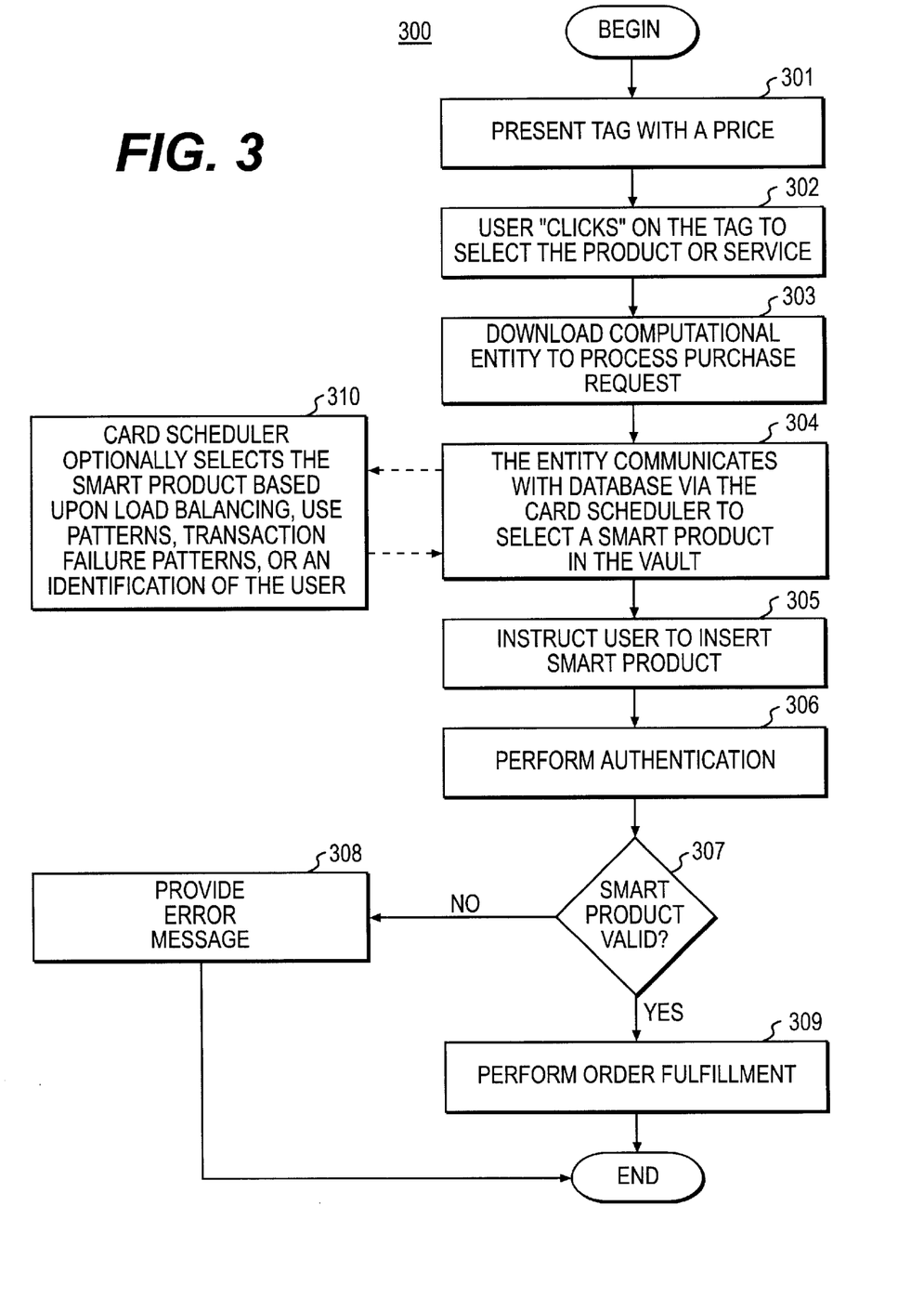
FIG. 3 is a flow chart of a purchase routine for processing smart product transactions.
Figure 4:
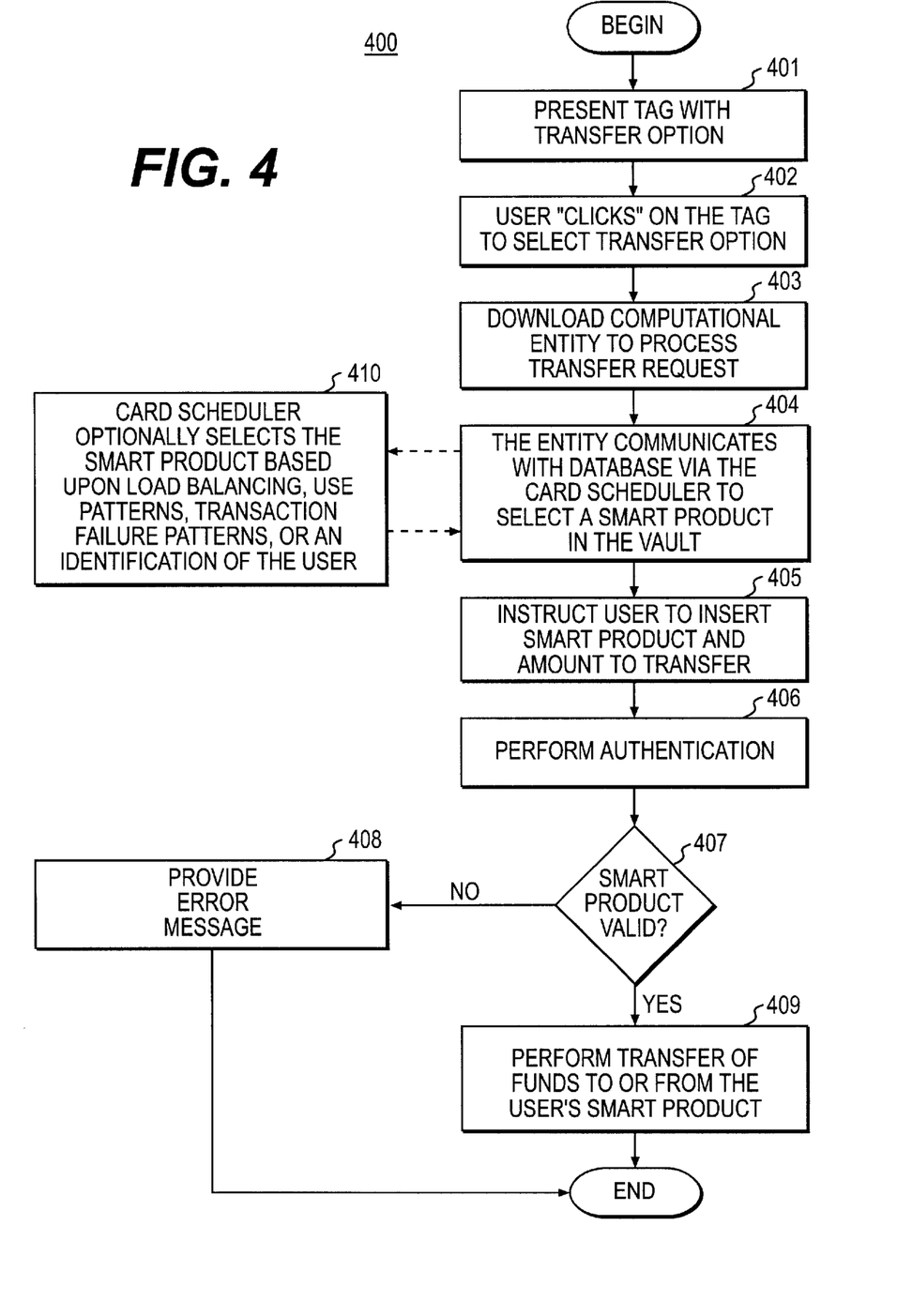
FIG. 4 is a flow chart of an automatic teller (ATM) routine for processing smart product transactions.
Figure 5:
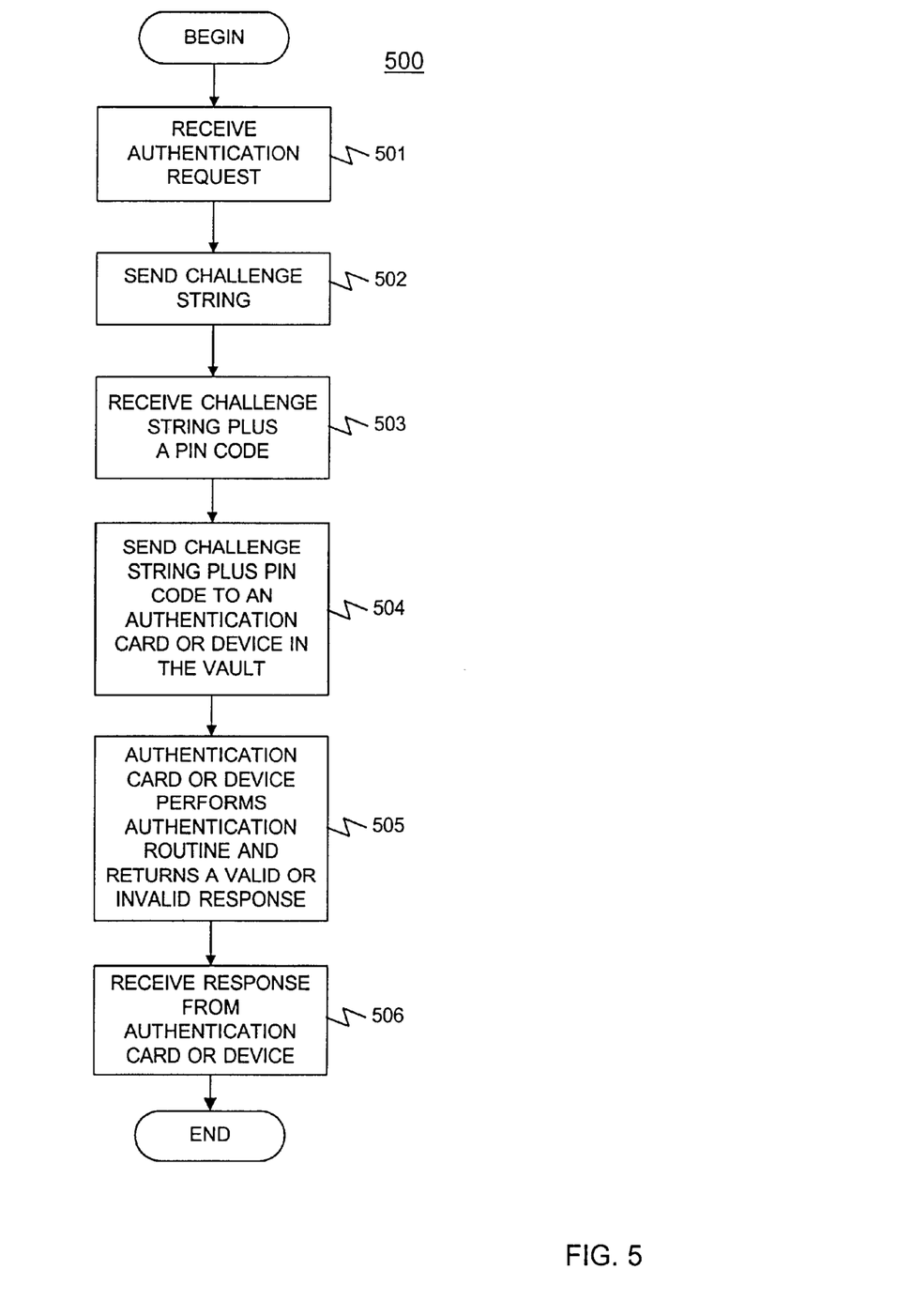
FIG. 5 is a flow chart of a process for authenticating smart product transactions.

FIGS. 3–5 are flow charts illustrating processing for smart product transactions in conjunction with system 100 of FIG. 1 and database 200 of FIG. 2. This processing provides for certain advantages, particularly in comparison with single card-to-card transactions. Because of the plurality of smart products available in the vault, if a smart product is unavailable due to, for example, a lock-up or what is referred to as a "tear," other smart products are available to conduct the transaction. A "tear" occurs when a smart product is removed from its reader before the transaction is complete. When the smart product causing the tear is reinserted into a reader, the tear is usually automatically corrected. However, a smart product may lock-up if it experiences too many tears. Unlocking the smart product typically requires use of a special reset card, issued by smart product providers. Those providers typically do not want to issue reset cards to individual users, and thus using a reset card in the vault provides a convenient way to unlock smart products.

If a transaction involves an amount greater than that available on any particular smart product in the vault, a plurality of smart products may be used for the transaction. Thus, transactions may be load balanced across many smart products.

Also, the vault provides for processing of concurrent users. Instead of processing transactions sequentially, which can be a time-consuming process, a system may simultaneously use different smart products in the vault for concurrently processing transactions involving different users.

FIG. 3 is a flow chart of a process 300 for performing a purchase routine for purchase module 103. process 300 provides the capability for a smart product user to purchase a product or service interacting with vault 108, and process 300 may be performed repeatedly and concurrently for different users using different smart products in vault 108. In process 300, the user is presented with a tag, for example, a hypertext markup language (HTML) tag, including a price for a particular product or service (step 301). This HTML tag may be presented on, for example, display device 120. The user "clicks" on the tag to select the identified product or service (step 302), which may constitute a purchase request. The user may enter a purchase request in other ways; for example, the user may select the tag using any type of cursor-control device or the user may enter the request using a keyboard. In addition, the request may constitute any type of indication of a purchase request.

In response to the user's selection, module 103 downloads a computational entity, such as an applet written in the Java programming language, to process the user's purchase request (step 303). The entity communicates with the database via card scheduler 121 to select a smart product, or a plurality, in vault 108 (step 304), which may involve determining if particular smart products in the vault are assigned for servicing that user (step 310) in the event that a pool of smart products are reserved for that user. Based on the type of currency involved in the transaction, card scheduler 121 may access the corresponding currency in table 202 to select, using vector array 203, a smart product in the vault having that type of currency. Java applets and HTML tags are known in the art and are explained, for example, in the following document, which is incorporated herein by reference: Jamie Jaworski, "Java 1.1 Developer's Guide, Second Edition,"pp. 330–342, 750–754, Sams.net publishing, 1997.

In selecting a smart product, card scheduler 121 uses the functions of currency manager 122 and card pool manager 123. In particular, card pool manager 123 selects a pool of smart products in vault 108, and currency manager 122 selects a particular smart product, or a plurality, within that pool. Card pool manager 123 and currency manager 122 may make these selections based on particular criteria related to the transaction such as, as shown in step 310, load balancing, use patterns, or transaction failure patterns. It may use one or more of the criteria shown in step 310 based, for example, on particular system requirements.

Load balancing involves scheduling use of the smart products in a vault to avoid undue wear by spreading the transactions ("the load") over different smart products. Currency is typically spread among many smart products to avoid a large amount on any one particular smart product to reduce the effects of a failure of that smart product. The amount of currency on each smart product in a vault may depend on the types of transactions. A history of small transactions may require only small amounts on the smart products in a vault while a history of large transactions typically requires large amounts. Card pool manager 123 and currency manager 122 may use heuristic techniques based on historical use patterns to determine optimum amounts for each smart product in a vault.

Card pool manager 123 and currency manager 122 may also make the selection based upon other factors. In particular, they may use heuristic techniques based on historical use patterns to manage latency of the Internet, intentional attacks aimed at "locking up" a vault, and prime time attacks. The Internet latency means that at particular times the Internet may process communications faster than at other times, and card pool manager 123 and currency manager 122 may make selections based on the time of the transaction and knowing, from past use, if they expect an Internet communication to be fast or slow at that time.

Managing intentional attacks means that card pool manager 123 and currency manager 122 can repair smart product "tears," explained above. An intentional attack may mean that a large group of users intentionally cause failures by removing their smart products before completion of the transactions. These actions may be aimed at causing an entire vault to "lock up" and hence be unavailable for use. Currency manager 122 and card pool manager 123 may use heuristic techniques to detect and manage such intentional attacks. For example, they may detect a large amount of tears from a particular geographic region, or they may detect a particular pattern of tears such as a certain number of tears per second. In order to repair tears, currency manager 122 and card pool manager 123 ensure that the failed smart products in a vault as a result of a tear are available or "on-line" so that the tear may be repaired when the corresponding user's smart product is reinserted into a reader or otherwise available to complete the transaction.

Managing prime time attacks means that currency manager 122 and card pool manager 123 make selections based on particular use patterns. They may use heuristic techniques to determine based on historical use the times involving high or low numbers of transactions. For example, they may determine that a large number of transactions occur in the early evening and make selections based upon that information to account for the high volume and to ensure that sufficient smart products are available in a vault. These techniques for smart product selection may make use of the information in vector array 203 concerning the values of currency and other information for each corresponding smart product in the vault. Also, these heuristic techniques may use queuing theory or stochastic modeling for determining the selection. Queuing theory is explained in, for example, the following text, which is incorporated herein by reference: "Encyclopedia of Computer Science, Third Edition," pp. 1141–44, Van Nostrand Reinhold (edited by Anthony Ralston and Edwin D. Reilly), 1993.

After selection of a smart product in vault 108, purchase module 103 instructs the user to insert a smart product (step 305). This instruction may occur on display device 120. Module 103 then performs authentication (step 306), explained below, and as a result of the authentication, it determines if the smart product is valid (step 307). If it is not valid, an error message may be provided (step 308), such as on display device 120. Otherwise, module 103 may perform order fulfillment (step 309), which involves deducting the price from a digital value of currency on the user's smart product, increasing a value of currency on the corresponding smart product selected in vault 108, and providing the user with access to the purchased product or service.

FIG. 4 is a flow chart of a process 400 for performing an ATM routine for ATM module 104, and process 400 may be performed repeatedly and concurrently for different users using different smart products in vault 108. The ATM routine is similar to the purchase routine with the exception that the ATM routine involves transfer of funds to or from a user's smart product, rather than purchase of a product or service. As shown in FIG. 4, ATM module 104 presents a tag, for example, an HTML tag, with a transfer option (step 401). This HTML tag may be presented on, for example, display device 120. The user "clicks" on the tag to select the transfer option (step 402), which may constitute a transfer of funds request. The user may enter a transfer of funds request in other ways; for example, the user may select the tag using any type of cursor-control device or the user may enter the request using a keyboard. In addition, the request may constitute any type of indication of a transfer of funds request.

In response to the user's selection, ATM module 104 downloads a computational entity, for example an applet written in the Java programming language, to process the transfer request (step 403). The entity communicates with the database via card scheduler 121 to select a smart product, or a plurality, in vault 108 (step 404), which may involve determining if particular smart products in the vault are assigned for servicing that user (step 410) in the event that a pool of smart products are reserved for that user. Based on the type of currency involved in the transaction, card scheduler 121 may access the corresponding currency in table 202 to select, using vector array 203, a smart product in the vault having that type of currency. Also, in selecting a smart product, as explained above, card scheduler 121 uses the functions of currency manager 122 and card pool manager 123 and may make these selections based on particular criteria related to the transaction such as, as shown in step 410, load balancing, use patterns, or transaction failure patterns. It may use one or more of the criteria shown in step 410.

After selection of a smart product in vault 108, ATM module 104 instructs the user to insert a smart product (step 405). This instruction may occur on display device 120. Authentication of the smart product is performed (step 406), explained below, and in response, ATM module 104 determines if the smart product is valid (step 407). If it is not valid, ATM module 104 may provide an error message (step 408), such as on display device 120. Otherwise, ATM module 104 performs the transfer of funds to or from the user's smart product (step 409). The transfer involves deducting or increasing a digital value of currency on the user's smart product by the amount requested, and performing a corresponding increase or decrease in the digital currency value of the smart product selected in the vault.

FIG. 5 is a flow chart of a process 500 for performing authentication for authentication module 105, and process 500 may be performed repeatedly and concurrently for different users. process 500 may use the known Mondex protocol or other protocols for authenticating smart product transactions. Module 105 receives an authentication request (step 501). In response, module 105 sends a challenge string to the reader for the user's smart product. Module 105 then receives back the challenge string plus a personal identification number (PIN) code (step 503).

Module 105 sends the challenge string plus pIN code to an authentication card or device in the vault (step 504). The authentication card or device constitutes a particular smart product for verifying a user's smart product. The authentication card or device typically includes a protocol, such as Mondex protocol, for performing verification of the challenge string and pIN code. The authentication card or device performs the authentication routine and returns to module 105 a valid or invalid response (step 505). Module 105 receives that response from the authentication card or device and uses it for validating the user's smart product (step 506). Other authentication protocols may be used, such as any challenge/response protocol using a shared secret value or any certificate-based authentication scheme.

The processes shown in FIGS. 3–5 for modules 103, 104, and 105 may be concurrently executed. For example, as module 103 executes a purchase request from one smart product user, ATM module 104 may execute a transfer request from another user. In addition, the steps for the processes shown in FIGS. 3 and 4 need not be executed sequentially in the stated order. Rather, the steps may be executed in a different order, or certain steps may be executed concurrently, to achieve the same function of processing the requested transaction.

Figure 6:
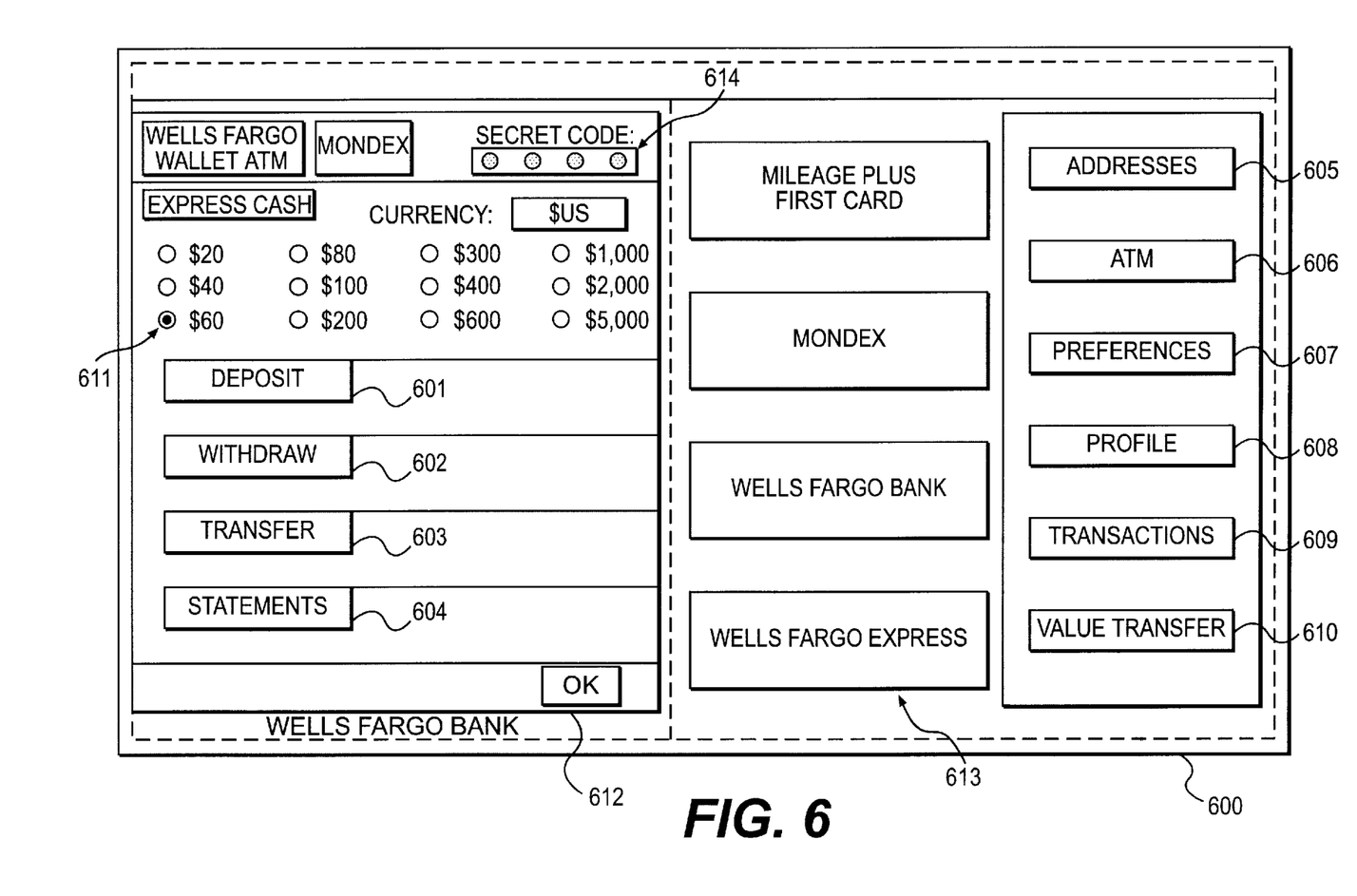
FIG. 6 is an example of a user interface for use in conducting smart product transactions.

FIG. 6 is an example of a user interface for processing smart product transactions. Display 600 is typically presented on display device 120. In a display 600 users may view an indication of a dollar or other currency amount for adjusting the purse of their smart products in window 611. The user may perform functions by manipulating the appropriate key, such as requesting a deposit (601), a withdrawal (602), a transfer of funds (603), or statements concerning transactions (604). The user may confirm the requested transaction by selected OK icon 612, and a window 614 may be used to indicate entry of a PIN code for use in authenticating transactions or verifying a smart product user.

Display 600 may include various icons for permitting a user to access programs or information. A user may use icon 605 for accessing an address book. Icon 606 may be used to access an ATM funds transfer program, such as ATM module 104. Icon 607 may be used to access preferences, which may include the user's preferences relating to use of a smart product. Icon 608 may be used to access a user's particular profile. Icon 609 may be used to access transactions such as a deposit, withdrawal, or transfer of funds. Icon 610 may be used to access a value transfer function. Icons in a window 613 may display various types of smart products that may be read.

Machines implementing the steps shown in FIGS. 3, 4, and 5, may include computer processors for performing the functions. They may include modules or programs configured to cause the processors to perform the above functions. They may also include computer program products stored in a memory. The computer program products may include a computer-readable medium or media having computer-readable code embodied therein for causing the machines to perform functions described above. The media may include a computer data signal embodied in a carrier wave and representing sequences of instructions which, when executed by a processor, cause the processor to securely address a peripheral device at an absolute address by performing the method described in this specification. The media may also include data structures for use in performing the method described in this specification.

While the present invention has been described in connection with an exemplary embodiment, it will be understood that many modifications will be readily apparent to those skilled in the art, and this application is intended to cover any adaptations or variations thereof. For example, various types of smart products, various authentication protocols, and various hardware embodiments for the processing may be used without departing from the scope of the invention. This invention should be limited only by the claims and equivalents thereof.

What is claimed is:

1. An apparatus for processing smart product transactions, comprising:
    a module configured to electronically receive a request for a smart product transaction;
    a module configured to use heuristic techniques to select a particular smart product among a plurality of electronically accessible smart products, wherein said selection minimizes a probability that said transaction will fail; and
    a module configured to process the transaction using the selected smart product.

2. The computer system of claim 1 wherein the select module is further configured to identify the particular smart product based upon historical use of the plurality of smart products.

3. The computer system of claim 1 wherein the process module is further configured to authenticate the transaction.

4. The computer system of claim 1 wherein the select module is farther configured to identify the particular smart product based upon an identification of a person submitting the transaction.

5. The computer system of claim 1 wherein:
    the receive module is further configured to receive a purchase request; and
    the process module is further configured to process the purchase request using the selected smart product.

6. The computer system of claim 1 wherein:
    the receive module is further configured to receive a transfer of funds request; and
    the process module is further configured to process the transfer of funds request using the selected smart product.

7. A computer system for processing smart product transactions, comprising:

a reader for reading information from and writing information to a smart product;

a vault for storing a plurality of electronically accessible smart products; and a processor coupled to the reader and the vault, the processor operating to:

electronically receive a request for a smart product transaction;

use heuristic techniques to select a particular smart product among the plurality of electronically accessible smart products, wherein said selection minimizes a probability that said transaction will fail; and process the transaction using the selected smart product.

8. The computer system of claim 7 wherein the processor further operates to identify the particular smart product based upon historical use of the plurality of smart products.

9. The computer system of claim 7 wherein the processor further operates to authenticate the transaction.

10. The computer system of claim 7 wherein the processor further operates to identify the particular smart product based upon an identification of a person submitting the transaction.

11. The computer system of claim 7 wherein the processor further operates to:

receive a purchase request; and process the purchase request using the selected smart product.

12. The computer system of claim 7 wherein the processor further operates to:

receive a transfer of funds request; and process the transfer of funds request using the selected smart product.

13. A computer-implemented method for processing smart product transactions, comprising:

electronically receiving a request for a smart product transaction;

using heuristic techniques to select a particular smart product among a plurality of electronically accessible smart products, wherein said selection minimizes a probability that said transaction will fail; and processing the transaction using the selected smart product.

14. The computer-implemented method of claim 13 wherein the selecting includes identifying the particular smart product based upon historical use of the plurality of smart products.

15. The computer-implemented method of claim 13 wherein the processing includes authenticating the transaction.

16. The computer-implemented method of claim 13 wherein the selecting includes identifying the particular smart product based upon an identification of a person submitting the transaction.

17. The computer-implemented method of claim 13 wherein:

the receiving includes receiving a purchase request; and the processing includes processing the purchase request using the selected smart product.

18. The computer-implemented method of claim 13 wherein:

the receive includes receiving a transfer of funds request; and the processing includes processing the transfer of funds request using the selected smart product.

19. A computer-readable medium containing instructions for controlling a computer system to perform a method, the method comprising:

electronically receiving a request for a smart product transaction;

using heuristic techniques to select a particular smart product among a plurality of electronically accessible smart products, wherein said selection minimizes a probability that said transaction will fail; and processing the transaction using the selected smart product.

20. The computer-readable medium of claim 19 wherein the selecting includes identifying the particular smart product based upon historical use of the plurality of smart products.

21. The computer-readable medium of claim 19 wherein the processing includes authenticating the transaction.

22. The computer-readable medium of claim 19 wherein the selecting includes identifying the particular smart product based upon an identification of a person submitting the transaction.

23. The computer-readable medium of claim 19 wherein:

the receiving includes receiving a purchase request; and the processing includes processing the purchase request using the selected smart product.

24. The computer-readable medium of claim 19 wherein:

the receive includes receiving a transfer of funds request; and the processing includes processing the transfer of funds request using the selected smart product.

25. An apparatus for processing smart product transactions, comprising:

means for specifying plurality of vectors, each of the vectors identifying an address for accessing a smart product within a plurality of electronically accessible smart products, and identifying a value of the particular smart product;

means for specifying a plurality of types of currencies, each of the types of currencies being associated with at least one of the vectors;

means for electronically receiving a request for a smart product transaction;

means for selecting a particular smart product among the plurality of electronically accessible smart products, wherein said selection minimizes a probability that said transaction will fail due to a system malfunction; and means for processing the transaction using the selected smart product.

* * * * *

UNITED STATES PATENT AND TRADEMARK OFFICE
CERTIFICATE OF CORRECTION

PATENT NO. : 6,474,544 B2 Page 1 of 1
DATED : November 5, 2002
INVENTOR(S) : Rinaldo Di Giorgio et al.

It is certified that error appears in the above-identified patent and that said Letters Patent is hereby corrected as shown below:

Column 10,
Line 33, "An apparatus" should read -- A computer system --;
Line 51, "farther" should read -- further --;

Column 12,
Lines 5 and 35, "receive" should read -- receiving --;
Line 41, after "specifying" insert -- a --; and
Line 52, "selecting" should read -- using heuristic techniques to select --.

Signed and Sealed this

Thirteenth Day of May, 2003

JAMES E. ROGAN
*Director of the United States Patent and Trademark Office*